UNITED STATES PATENT OFFICE.

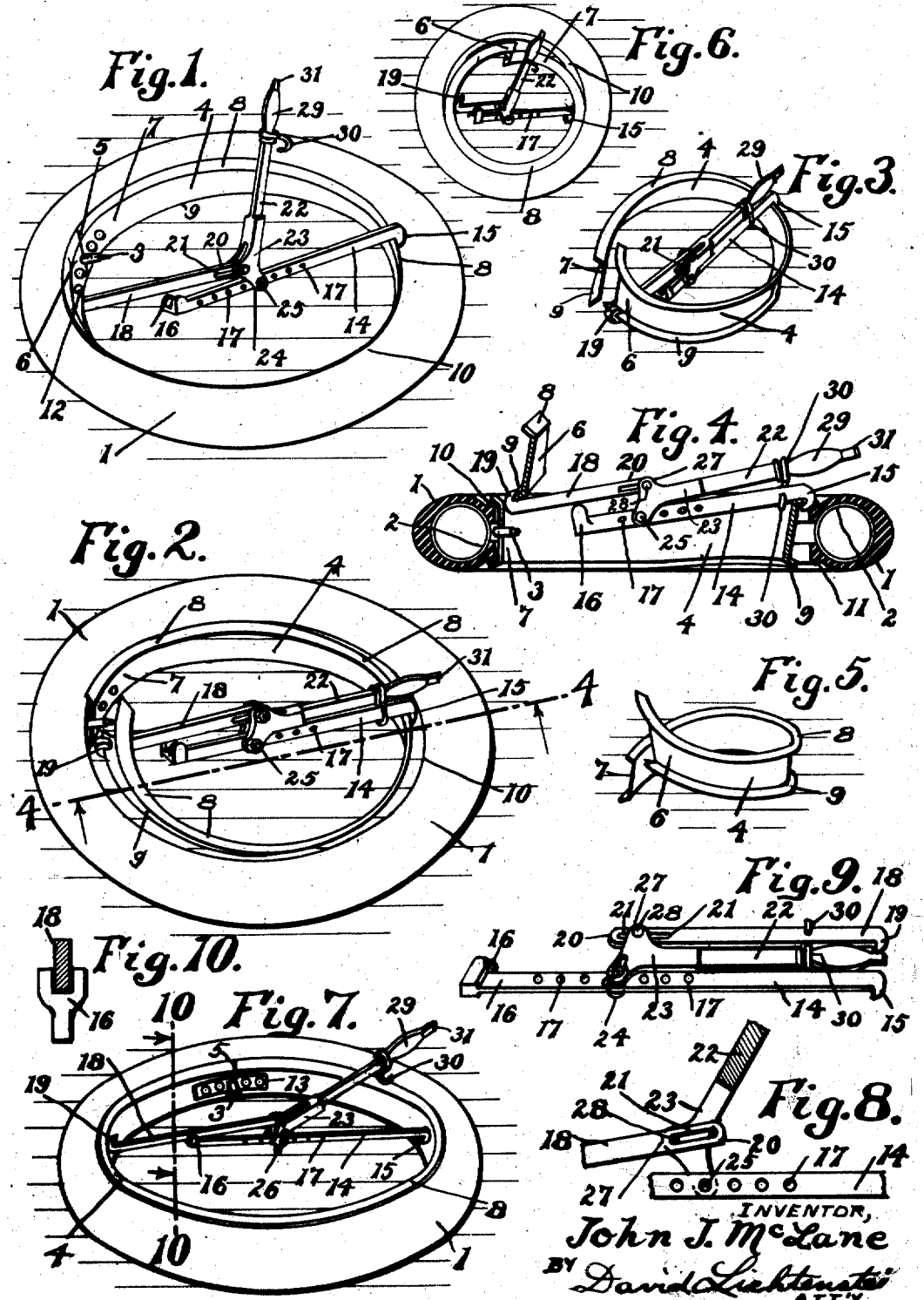

JOHN J. McLANE, OF BOSTON, MASSACHUSETTS.

DEMOUNTABLE-SPLIT-RIM TOOL.

1,251,902.  Specification of Letters Patent.  Patented Jan. 1, 1918.

Application filed December 1, 1915. Serial No. 64,554.

*To all whom it may concern:*

Be it known that I, JOHN J. McLANE, a citizen of the United States, residing at Boston, in the county of Suffolk and State of Massachusetts, have invented a new and useful Improvement in Demountable-Split-Rim Tools, of which the following is a specification.

My invention relates to improvements in automobile rim tools for attaching and detaching demountable one-piece split rims and tires to and from each other, the object being to provide a tool which is adjustable to fit any standard size of rim and serves in a dual capacity;—one function being to contract and distort the rim so that the same will become free from the tire, and the other function being to expand the rim when placed within a tire, so that the ends at the split of the rim will position themselves adjacent to each other properly,—the latter function being found to be particularly important and serviceable when adjusting and setting rims to new tires which have not been stretched, wherein the rim at the first instance invariably positions itself with the ends at the split overlapping each other, requiring considerable force to expand the rim sufficiently to unlap the ends so that the same will set properly with the tire.

To these as well as other ends, my invention consists in the novel features of construction, combination and arrangement of parts, described in the following specification and particularly pointed out in the subjoined claims.

Referring to the accompanying sheet of drawings—

Figure 1, is a perspective view of my tool, shown applied to a demountable split rim which is about to be detached from the tire,—the tire being represented as lying flat on the floor or ground, and the operating lever of the tool being set in the upright position, ready for contracting the rim.

Fig. 2, is the same view as Fig. 1, but shows the operating lever shifted to the horizontal position, showing the same coupled with the adjustable arm, with the rim contracted and distorted, clearing the tire and ready for removal therefrom.

Fig. 3, shows the rim locked in the contracted and distorted condition by the tool, as shown in Fig. 2, but removed from the tire.

Fig. 4, is a sectional view taken on line 4—4 in Fig. 2, showing the relative positions of the ends of the split rim when contracted and distorted, by the action of the tool thereon.

Fig. 5, is a diagrammatic view of the rim with the tool removed, showing the same contracted as in Figs. 2 and 3.

Fig. 6 is a diagrammatic view showing a usual case where the ends of the split rim assume an overlapped position, requiring the use of the tool as an expansion tool,— the same being shown set within the rim ready to expand it and cause the ends of the same to become unlapped and set properly with the tire.

Fig. 7, is the same view as Fig. 6, but shows the rim properly positioned with the tire and the key-plate set.

Fig. 8, is a mid-section taken through the operating lever, as set in Fig. 7, which is the expanding position of the tool, showing the forked eccentric end of the lever engaging with the two arms of the tool.

Fig. 9, is a perspective view of the tool, showing the same folded and secured in the non-operating position.

Fig. 10, is a view taken on line 10—10 in Fig. 7, looking in the direction of the arrows, showing the floating-arm slidably engaging within the forked supporting member provided on the end of the fulcruming and anchoring arm, Like numerals refer to like parts throughout the several views of the drawing.

The numeral 1 represents a shoe of a tire commonly used with pneumatic tires, housing the inner tube 2 which has the usual valve-stem 3 protruding through the demountable split rim 4 at or near the split 5 of the same. The rim 4 represents the so-called Baker demountable rim which is usually designed with the diagonal split 5 fitting about the valve-stem 3 and formed by the ends 6 and 7,—the rim having the clencher-flanges 8 and 9 which fit about the upper and lower clencher-flanges 10 and 11, respectively, of the shoe 1. 12 are the projecting acorn-shaped lugs which fit within the holes provided for the same in the coupling, or key-plate 13 which bridges across the split 5 of the rim and permits the valve-stem 3 of the inner tube to protrude through it, as shown in Fig. 7.

The rim tool consists of an adjustable fulcruming and anchoring arm 14 which is provided at its extreme outer end with the downwardly projecting hook 15, at its inner end with the extension and forked-guiding end 16, and intermediate said ends with the series of fulcruming holes 17; the floating-arm 18 which is provided at its extreme outer end with the projecting hook member 19 oppositely disposed to that of the aforesaid hook 15 (when both arms are unfolded in the working position,) and the engaging inner end 20 which is provided with the elongated hole 21; and an eccentric operating lever 22 which is provided with the inner eccentric and forked end 23 having the offset fulcruming lugs 24 at the extreme end of said eccentric lever which support the fulcruming stud 25, which stud pivotally engages with the fulcruming holes 17 of the adjustable anchor arm 14, and is preferably provided with the butterfly-nut 26 for readily permitting the shifting of the adjustable anchor arm 14 from one fulcruming hole 17 to any of the others, without the use of extra tools,—the eccentric end 23 of the lever 22 is also provided with a second set of opposite lugs 27 which support the pivotally engaging stud 28, which stud pivotally and floatably engages with the elongated hole 21 of the inner end 20 of the floating-arm 18 with the operating lever 22. The operating lever 22 is provided at the operating end 29 with the coupling member 30, which is preferably pivotally and floatably secured thereto for enabling the hook end of the same to engage with the adjustable-arm 14, as shown in Figs. 2, 3 and 4, or with the floating-arm 18, as shown in Fig. 9,—the operating end 29 of the lever 22 being preferably provided at its extreme end with a prying tip 31 which may be used for prying the coupling or key-plate of the demountable rim off from its engaging position with the projecting acorn-shaped lugs 12. Both the arms of the tool are set within the forked end of the lever as shown.

Having thus described the parts of my invention in detail, the manner in which the same may be operated is as follows:

When the tool is not in use the same is folded in the manner shown in Fig. 9. To set the tool for detaching a rim from a tire, the same is unfolded and the fulcruming stud 25 is set in the proper fulcruming hole 17 for the particular sized rim to be operated upon. The tool, once adjusted for fitting the rim, is then set and positioned with the operating lever 22 upright, the hook of the anchoring arm 14 engaging with the top clencher-flange 8 of the rim 4, and the hook 19 of the floating-arm 18 engaging with the lower clencher-flange 9 near the split 5 of the rim 4, as shown in Fig. 1; the hooks 15 and 19 thus engaging with the rim at opposite points on opposite clencher-flanges. The lever 22 is then forced downward toward the anchoring arm 14, as shown in Fig. 2. The connecting stud 28 of the lever in that operation, engages with the extreme outer end of the elongated hole 21 in the end 20 of the floating-arm 18, and since the lever is fulcrumed with the anchor arm 14, the floating-arm 18 is operated upon and forced to draw in, carrying along with it the end 6 of the rim to which it is connected, by means of the hook 19 engaging with the lower clencher-flange 9. As the lever 22 is thus operated, the diameter of the rim 4 becomes contracted and the end 6 of the same twists itself upward, due to the tendency of the tool to assume the position shown in Fig. 4 when engaged in contracting the rim, namely, in bringing the hook 19, at the end 6 of the rim, in practically the same plane that the hook 15 of the other arm of the tool is in. The lever, having been brought into the down position, shown in Fig. 2, may then be coupled with the anchor arm 14 by means of the coupling member 30 which thus locks the tool and consequently holds the rim rigid in its contracted and distorted position, free from the inner diameter of the shoe 1 and readily removable therefrom by means of the lifting of the same by the tool, which holds the rim secured in the contracted position and enables the same to be held in that position as long as may be desired; it being understood that through the use of my tool the rim may thus be removed from the tire without the use of other tools for the purpose. With the rim thus locked in the contracted position, the operator may lift the same from within the tire, by means of the tool, and set the same to one side, as shown in Fig. 3; thus keeping the rim in that locked position, ready to be replaced back within a tire.

Now, to reset the locked rim within a new tire, or a repaired tire, as the case may be, the rim is preferably set with the end 7, adjacent to the valve-stem 3, as shown in Fig. 2. The clamping member 30 is then unlocked from the anchor arm 14 and the lever 22 is allowed to gradually come back to its original position, and at the same time the operator, with his free hand, may be bearing down on the rim for forcing the same back into engagement with the tire. In resetting the contracted rim within the tire and allowing it to expand as above explained, it often happens, especially when using new and unstretched tires, that the ends 6 and 7 overlap, or that the rim, in other ways, does not readjust itself properly to fit with the tire as it is supposed to. In that event, the expanding feature of the tool is brought into play and performs a very important function in the following manner:

First, the floating-arm 18 is moved back within the lever, (which may be folded back toward the anchor arm 14 in the first instance,) so that the engaging stud 28 engages with the innermost end of the elongated hole 21 provided in the end 20 of the floating-arm 18. The floating-arm 18 (Fig. 8) is also allowed to slidably set within the forked supporting end 16 of the fulcruming and anchor arm 14. The tool is then positioned within the rim so that the hooks 15 and 19 engage with the inner diameter of the rim as shown in Figs. 6 and 7.

With the tool thus set and positioned within the rim, as shown in Fig. 7, the span between the hooks of the arm members may be increased according as may be desired, the floating-arm 18, which is held against buckling in the guide member 16, is forced outward, directly against the rim, and consequently increases its diameter and expands the same so that the ends become unlapped and set adjacent to each other, it being understood that the tool may be turned around to operate within any part of the rim, thus affording the operator a means for applying pressure for forcing expansion directly at the point of the rim where the same is found to be necessary. It must also be understood that when the tool is once adjusted for a particular sized rim that the elongated hole 21 in the floating-arm provides ample clearance to enable the operator to position the tool within the contracted diameter of the rim, for the purpose of expanding the same without necessitating further adjustment of the tool.

It may also be understood that by using the tool as an expansion tool, that the operator may thereby be enabled to readily replace the key-plate 13, after the rim has once been properly set with the tire by applying the tool so that one of the hooks engages directly with the key-plate and the other with the rim.

It may also be observed that by shifting the adjustable-arm from one fulcruming hole to any of the others, that the tool may thus be varied accordingly, and may thus be set to fit different sizes of rims,—it being understood that a sufficient number of fulcruming holes may be provided to cover the range of standard sizes of rims. Also that the setting of the tool for one particular size of rim will suffice to permit the tool to operate on that rim either as a contracting or as an expansion tool, according as may be desired.

While the preferred embodiments of my invention have been described in detail, it will be understood that I do not wish to be limited to the particular construction set forth, since various changes in the form, material, proportions, and arrangement of parts and in the details of construction may be resorted to without departing from the spirit and scope of the invention, or destroying any of the advantages contained in the same, heretofore described and defined in the subjoined claims.

What I claim is:

1. A rim tool, consisting of an operating lever, having a forked end provided with opposite intermediate and opposite end bearings in the fork of said lever; a long arm terminating in a downwardly disposed hook at the extreme outer end thereof, provided with a series of intermediate adjusting and fulcruming holes and a forked guide-member at the extreme inner end thereof having the fork projecting upwardly and opposed to said hook; a short arm terminating in a hook at the extreme outer end thereof projecting upwardly and opposed to the aforesaid hook of said long arm and provided with an elongated hole near the extreme inner end thereof for affording the tool the adjustable feature for operating the tool on a given size of rim either as a contracting tool or as an expanding tool; a coupling-stud rigidly secured within said opposite intermediate bearings of said operating lever and adapted to slidably and pivotally engage said short arm with said operating lever; and a detachable coupling and fulcruming member detachably secured in said opposite end bearings of said lever and adapted to detachably couple said long arm with said operating lever, substantially as shown.

2. A rim tool consisting of an operating lever having a forked end provided with opposite intermediate and end bearings in the fork of said lever, and a handle portion at the other end of said lever provided with a swiveled hook member pivotally secured thereto for coupling said lever with the hereinafter mentioned long arm when the tool is used as a contracting tool and the rim has been contracted; a long arm terminating in a downwardly disposed hook at the extreme outer end thereof, provided with a series of intermediate adjusting and fulcruming holes and a forked guide-member at the extreme inner end thereof having the fork projecting upwardly and opposed to said hook; a short arm terminating in a hook at the extreme outer end thereof projecting upwardly and opposed to the aforesaid hook of said long arm and provided with an elongated hole near the extreme inner end thereof for affording the tool the adjustable feature for operating the tool on a given size of rim either as a contracting tool or as an expanding tool; a coupling-stud rigidly secured within said opposite intermediate bearings of said operating lever and adapted to slidably and pivotally engage the short arm with said operating lever; and a detachable coupling and fulcruming member detachably secured in said opposite end bearings of said lever and adapted to detachably couple said long arm with said operating lever, substantially as shown.

JOHN J. McLANE.

Witnesses:
B. H. CHERTOK,
R. LICHTENSTEIN.